(12) United States Patent
Murshid et al.

(10) Patent No.: US 9,515,729 B2
(45) Date of Patent: Dec. 6, 2016

(54) OMNIDIRECTIONAL FREE SPACE OPTICAL COMMUNICATIONS RECEIVER

(71) Applicant: Florida Institute of Technology, Inc., Melbourne, FL (US)

(72) Inventors: Syed H. Murshid, Palm Bay, FL (US); Michael F. Finch, Melbourne, FL (US)

(73) Assignee: Florida Institute of Technology, Inc., Melbourne, FL (US)

(*) Notice: Subject to any disclaimer, the term of this patent is extended or adjusted under 35 U.S.C. 154(b) by 62 days.

(21) Appl. No.: 14/700,012

(22) Filed: Apr. 29, 2015

(65) Prior Publication Data

US 2015/0333828 A1 Nov. 19, 2015

Related U.S. Application Data

(60) Provisional application No. 61/985,744, filed on Apr. 29, 2014.

(51) Int. Cl.
*H04J 14/08* (2006.01)
*H04B 10/112* (2013.01)
*H04B 10/11* (2013.01)

(52) U.S. Cl.
CPC ........... *H04B 10/1121* (2013.01); *H04B 10/11* (2013.01)

(58) Field of Classification Search
CPC .......................... H04B 10/1121; H04B 10/11
USPC ....................................................... 398/130
See application file for complete search history.

(56) References Cited

U.S. PATENT DOCUMENTS

| 5,165,774 A * | 11/1992 | Windross | B60Q 1/26 359/744 |
| 6,931,183 B2 * | 8/2005 | Panak | G02B 6/4405 385/101 |
| 2003/0011850 A1 * | 1/2003 | Sidorovich | G02B 27/48 398/126 |

OTHER PUBLICATIONS

Akella, "Building blocks for mobile free-space-optical networks," Proceedings of IFIP/IEEE International Conference on Wireless and Optical Communications Networks (WOCN), pp. 164-168, Mar. 2005.*
Akella, "Error analysis of multi-hop free-space-optical communication," Proceedings of IEEE International Conference on Communications (ICC), vol. 3, pp. 1777-1781, May 2005.*

(Continued)

*Primary Examiner* — Juan A Torres
(74) *Attorney, Agent, or Firm* — Lowndes, Drosdick, Doster, Kantor & Reed, P.A.; Courtney M. Dunn; Stephen C. Thomas

(57) ABSTRACT

A free space optical receiver comprising a photodetector and a fiber bundle. The fiber bundle comprises a plurality of optical fibers splayed apart at one of their ends to receive free space optical energy from multiple directions. The splayed apart ends of the plurality of optical fibers may create a hemispherical shape. Each of the plurality of optical fibers has an acceptance cone for which it couples optical energy into the splayed end of the optical fiber. The acceptance cones of the splayed ends of the plurality of optical fibers may overlap to form an omnidirectional acceptance zone. The other, non-splayed ends of the plurality of optical fibers are communicatively coupled to the photodetector, which is positioned to receive the free space optical energy from the non-splayed ends of the plurality of optical fibers. An optical communication system including the free space optical receiver is also described.

30 Claims, 13 Drawing Sheets

(56) References Cited

OTHER PUBLICATIONS

Yuksel, "Free-SpaceOptical Mobile Ad Hoc Networks: Auto-Configurable Building Blocks," Wireless Networks (in press), 2008.*

LED Fiber Optics. Available for sale Jan. 28, 2009.*

Cap, G.A., Rafai, H. H., and Sluss, J.J., "Optical tracking and auto-alignment transceiver system", IEEE Aerospace and Electric Systems Magazine 25(9), 26-31 (2010).

Chand, N., Deluck, T., Andrew, J.H., Eteson, B.M., Daniel, T.M., and Carlson, R.T., "Compact low-cost non-rf communication solutions for unmanned ground vehicles," in Military Communication Conference, 2010-MILCOM 2010, vol., No., pp. 1577-1582, (Oct. 31, 2010-Nov. 3, 2010).

Cap, G.A., Rafai, H. H., and Sluss, J.J., "Omnidirectional free-space optical (fso) receivers," in Proc. SPIE 6551, Atmospheric Propagation IV, 65510O, (May 10, 2007), 8 pages.

Chen, G., Xu, Z., Ding, H., and Sadler, B., "Path loss modeling and performance trade-off study for short-range non-line-of-sight ultraviolet communications," Opt. Express 17, 3929-3940 (2009).

Chen, G., Abou-Galala, F., Xu, Z., and Sadler, B.M., "Experimental evaluation of led-based solar blind nlos communication links," Opt. Express 16, 15059-15068 (2008).

Xu, Z., Chen, G., Abou-Galala, F., and Leonardi, M., "Experimental performance evaluation of non-line-of-sight ultraviolet communication systems," in Proc. SPIE 6709, Free-Space Laser Communications VII, 67090Y, (Sep. 25, 2007), 12 pages.

Murshid, S.H., Muralikrishman, H.P., and Kozaitis, S.P., "Mathematical modeling and experimental analysis of multiple channel orbital angular momentum in spatial domain multiplexing," in SPIE Proceedings vol. 8397 Enabling Photonics Technologies for Defense, Security, and Aerospace Applications VIII, 7-13 (2012).

Mahon, R., Burris, H.R., Rabinovich, W.S., Gilbreath, G.C., Goetz, P.G., Moore, C.I., Meehan, T.J., Stell, M.F., Vilcheck, M.J., Witkowsky, J.L., Swingen, L., Suite, M.R., Oh, E., and Koplow, J.P., "Free-space optical communication link at 1550 nm using multiple-quantum-well modulating retroreflectors in a marine environment," in Proc. SPIE 5160, Free-Space Laser Communication and Active Laser Illumination III, 456, (Jan. 27, 2004), pp. 456-465.

Carruthers, J.B. and Kahn, J.M., "Angle diversity for non-directed wireless infrared communication," 48(6), 960-969 (2000).

Bilgi, M. and Yuksel, M., "Multi-element free-space-optical spherical structures with intermittent connectivity patterns," in INFOCOM Workshops 2008, IEEE, vol., No., pp. 1-4, 13-18, (Apr. 2008).

Trisno, S., Ho, T.-H., Milne, S.D., and Davis, C.C., "Theoretical and experimental characterization of omnidirectional optical links for free space optical communications," in Military Communications Conference, 2004. MILCOM 2004. 2004 IEEE, vol. 3, No., pp. 1151-1157 vol. 3, (Oct. 31-Nov. 3, 2004).

Lambda Research Corporation, OSLO: Optics Software for Layout and Optimization: Optics Reference (2005), pp. 4-9.

Saunders, S.R. and Aragon-Zavala, A., Antennas and Propagation for Wireless Communication systems, Second Edition, John Wiley & Sons, Ltd (2007), pp. vii-xvii.

Thorlabs, "Photodiodes," (2013), pp. 1-4.

* cited by examiner

OMNIDIRECTIONAL FREE SPACE OPTICAL COMMUNICATIONS RECEIVER

CROSS-REFERENCE TO RELATED APPLICATION

This application claims the benefit of U.S. Provisional Application No. 61/985,744 entitled "Omnidirectional Free Space Optical Communications Receiver" filed Apr. 29, 2014, which is hereby incorporated by reference in its entirety.

FIELD OF INVENTION

The present disclosure generally relates to communication systems; more specifically, to a receiver for omnidirectional free space optical communications.

BACKGROUND

Free Space Optical (FSO) communication is the fusion of wireless technology and optical fiber communications systems. It has the potential of providing fiber optic data rates without the physical restraints of optical fiber cables. FSO communication has been an area of interest in providing high speed data links for various applications such as satellite communications and short range point-to-point optical networks. Tracking and auto-alignment techniques are often used to establish optical links for point-to-point networks. Lately, there has been a push toward developing non-line-of-sight (NLOS) or Omnidirectional FSO (O-FSO) links for military and other applications. Currently, O-FSO technologies range from a simple lens to telescopes to NLOS solar blind ultraviolet scattering. Spatial Domain Multiplexing (SDM) methods have been used in conjunction with FSO communication to encrypt data for transmission via helical ring patterns. Some other reported technologies include modulated retroreflectors, optical concentrators, spherical structures and direct detection schemes. However, these technologies are limited to data rates of less than 1 Mb/s with practical link ranges varying between 10 and 100 meters. Therefore, there is a need for FSO links that provide better omni-directionality, higher bandwidth and longer ranges.

SUMMARY

In accordance with the teachings disclosed herein, embodiments related to a free space optical communications receiver and related system are disclosed.

In an embodiment, a FSO receiver comprises a plurality of optical fibers and a photodetector. Each of the plurality of optical fibers have a first and a second end. The first ends of the plurality of optical fibers are splayed apart to receive FSO energy. The photodetector is communicatively coupled to the second ends of the plurality of optical fibers and is positioned to receive the FSO energy from the second ends of the plurality of optical fibers. Each of the first ends of the plurality of optical fibers may have an acceptance cone and these first ends may be splayed apart such that the acceptance cones of the plurality of optical fibers overlap to form an omnidirectional acceptance zone.

In another embodiment, an optical communication system comprises a transmitter and receiver. The transmitter is configured to transmit FSO energy and the receiver is configured to receive FSO energy. The receiver comprises a plurality of optical fibers and photodetector. The optical fibers each have a first and second end. The first ends of the plurality of optical fibers are splayed apart to receive FSO energy. The photodetector is communicatively coupled to the second ends of the plurality of optical fibers and is positioned to receive the FSO energy from the second ends of the plurality of optical fibers. Each of the first ends of the plurality of optical fibers may have an acceptance cone and these first ends may be splayed apart such that the acceptance cones of the plurality of optical fibers overlap to form an omnidirectional acceptance zone.

In a further embodiment, an optical communication system comprises a first transmitter, a second transmitter and a receiver. The first transmitter is located at a first position and is configured to transmit a first FSO energy beam. The second transmitter is located at a second position and is configured to transmit a second FSO energy beam. The receiver is configured to receive the first and second FSO energy beams. The receiver comprises first and second optical fibers and a photodetector. The first and second optical fibers each have a first and a second end. The first ends of the first and second optical fibers are splayed apart and are positioned to receive the first and second FSO energy beams, respectively. The photodetector is communicatively coupled to the second ends of the first and second optical fibers and is positioned to receive the first and second FSO energy beams from the second ends of the first and second optical fibers.

DETAIL DESCRIPTION OF THE EMBODIMENTS

A detailed description of the embodiments for a receiver for O-FSO communications will now be presented with reference to FIGS. 1-10B. One of skill in the art will recognize that these embodiments are not intended to be limitations on the scope, and that modifications are possible without departing from the spirit thereof. In certain instances, well-known methods, procedures, components, and circuits have not been described in detail.

Figure 1:
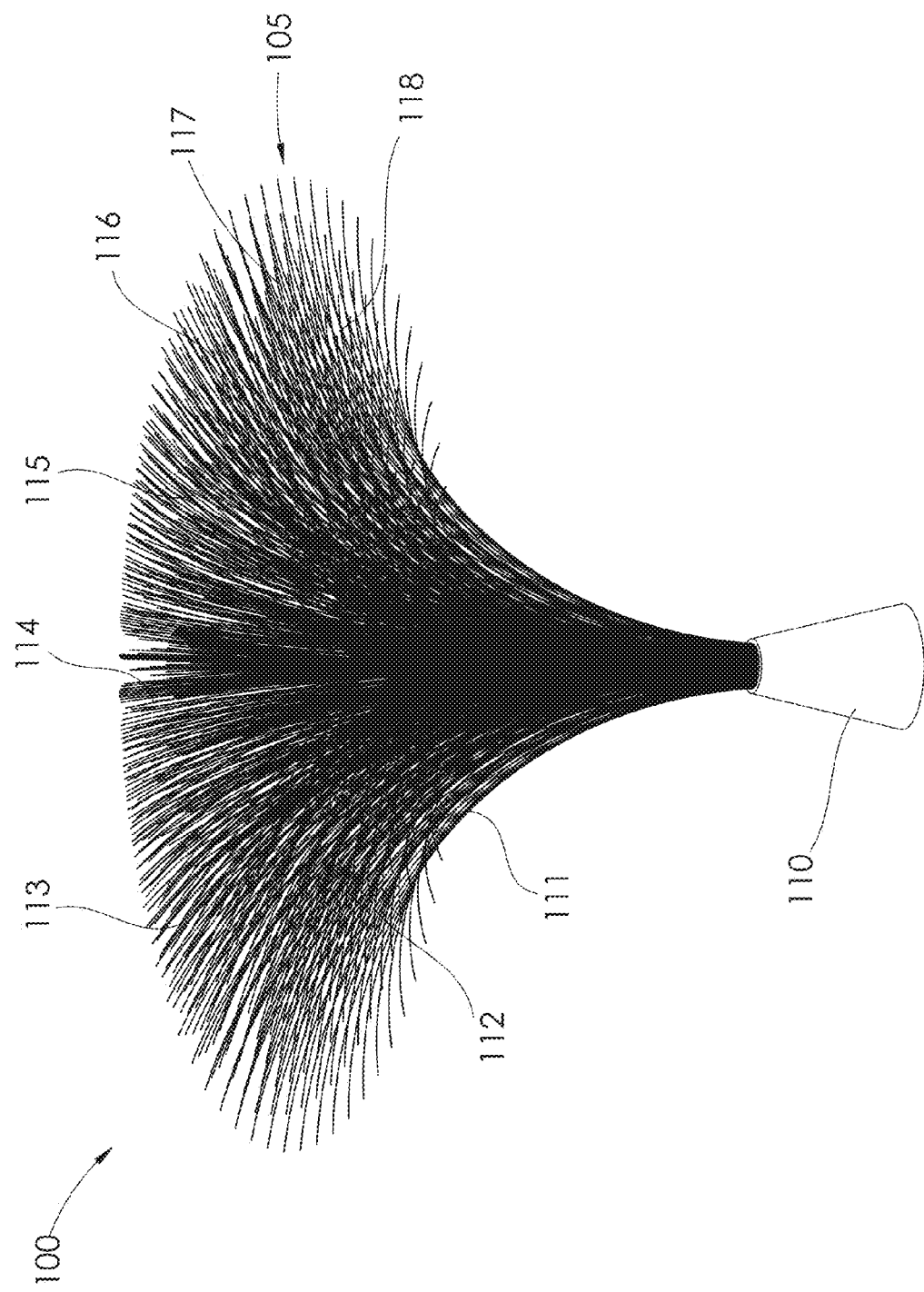
FIG. 1 is a perspective view of a FSO receiver according to an embodiment of the present invention.

An embodiment of O-FSO receiver 100 is shown in FIG. 1. O-FSO receiver 100 comprises fiber bundle 105, a photodetector (not shown) and container 110. Fiber bundle 105 comprises a plurality of optical fibers (e.g. optical fibers 111-118) that are splayed apart at one end to form a hemispherical shape. The plurality of optical fibers can be any fiber that transmits light, such as, for example, plastic or glass. The plurality of optical fibers may be between 8 and 10 inches long; however, other lengths are possible. The splayed ends of the optical fibers are positioned to gather light (or optical energy) from one or more light sources. The light sources can be located at different places and be transmitting light to receiver 100 from different directions. The received light then travels through the optical fibers to the non-splayed ends (not shown) where it is coupled to a photodetector (not shown) for further processing. Depending on the number, position, and size of the optical fibers in fiber bundle 105, a focusing device (not shown) may be used to focus the light coming from the non-splayed ends of the optical fiber.

Container 110 is optional and the size and shape of container 110 is exemplary. In this embodiment, container 110 is a hollow cone-shaped holder used to support fiber bundle 105. Container 110 may also contain the photodetector. Other forms of support can also be used. For example, a dome-shaped clear plastic support connected to the optical fibers of fiber bundle 105 at or near their splayed ends could be used to hold fiber bundle in its hemispherical shape. Alternatively, a fiber bundle could be 3D printed into a hemispherical shape using known techniques.

Figures 2A, 2B:
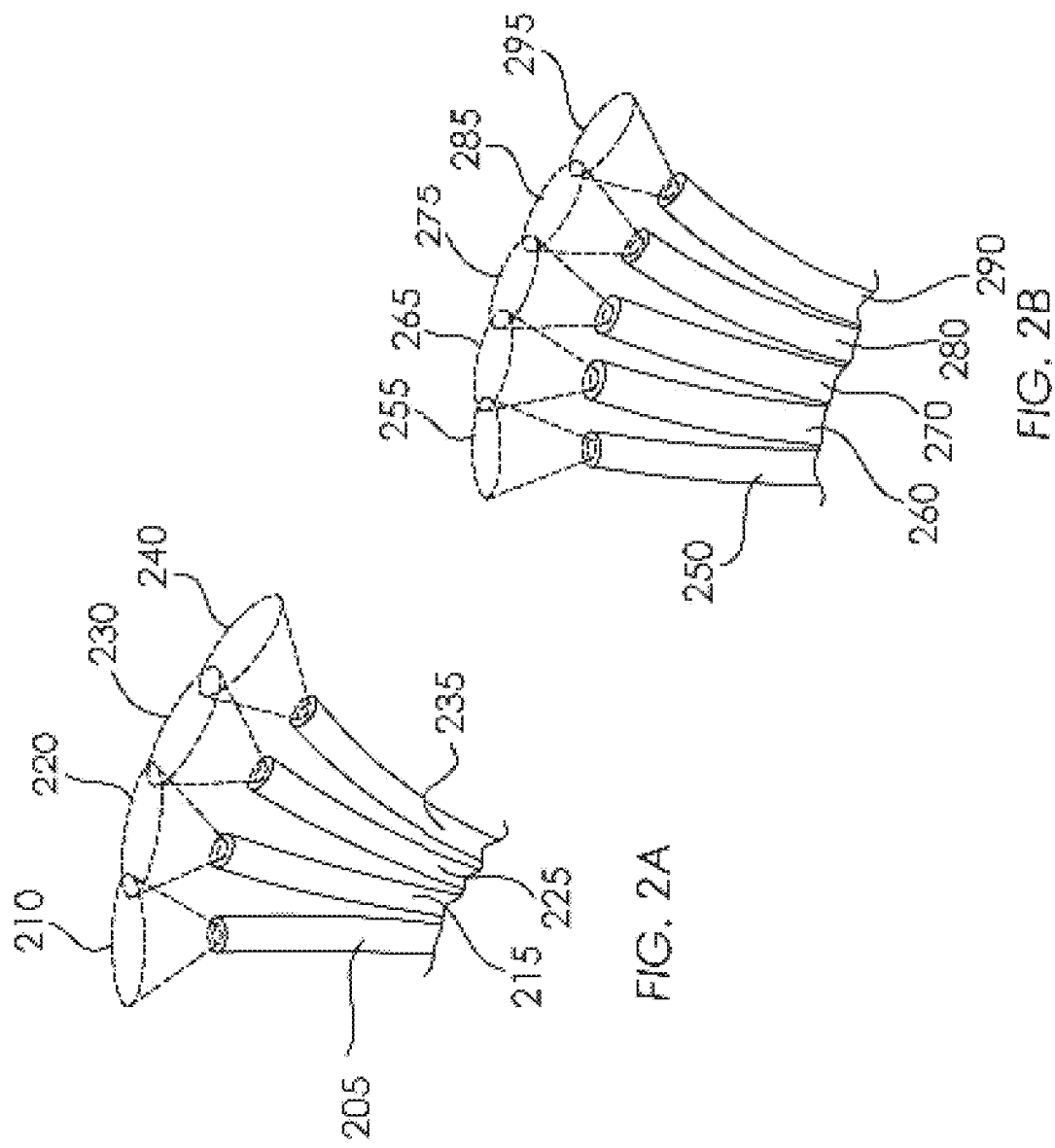
FIG. 2A is a perspective view of a subset of optical fibers from a fiber bundle showing their respective acceptance cones for coupling photons according to an embodiment of the present invention.
FIG. 2B is a perspective view of a subset of optical fibers having an alternative numerical aperture to the optical fibers shown in FIG. 2A and showing their respective acceptance cones for coupling photons according to an embodiment of the present invention.

The number of optical fibers needed in an optical fiber bundle in order to achieve omni-directionality depends on the numerical aperture of the optical fibers used. The numerical aperture determines the acceptance cone or field of view that the optical fiber will couple photons from. The size of the acceptance cone, in turn, determines the distance apart the splayed ends of the optical fiber can be. The distance between the splayed ends of the optical fibers determines how many optical fibers are needed to cover, for example, a hemispherical shape for full omni-directionality. The relationship between the numerical aperture and the number of optical fibers is illustrated in FIGS. 2A and 2B using two subsets of optical fibers which may be from different fiber bundles. In an embodiment of the invention, the invention comprises optical fibers of numerical aperture between 0.20 and 0.30; however, the invention may comprise optical fibers of any numerical aperture.

The splayed ends of four optical fibers (205, 215, 225 and 235) belonging to a fiber bundle (such as, for example, fiber bundle 105 of FIG. 1) are illustrated in FIG. 2A. Here, optical fibers 205, 215, 225 and 235 have acceptance cones 210, 220, 230 and 240, respectively. Optical fibers 205, 215, 225 and 235 are splayed apart such that the acceptance cones 210, 220, 230 and 240 overlap at least partially. Together, acceptance cones 210, 220, 230 and 240 create one acceptance zone. Acceptance cones 210, 220, 230 and 240 may also abut each other rather than overlap; however, overlap better ensures reception of photons from different angles.

The splayed ends of five optical fibers (250, 260, 270, 280 and 290), each having a smaller numerical aperture than those shown in FIG. 2A, are shown in FIG. 2B. Because optical fibers 250, 260, 270, 280 and 290 have a smaller numerical aperture, their acceptance cones, acceptance cones 255, 265, 275, 285 and 295, are narrower. In order for acceptance cones 255, 265, 275, 285 and 295 to overlap to create an a single acceptance zone, the splayed ends of optical fibers 250, 260, 270, 280 and 290 must be positioned closer together than optical fibers 205, 215, 225 and 235 of FIG. 2A. An additional optical fiber was also added to cover a similarly sized acceptance zone.

As more optical fibers are added to the optical fiber subset shown in FIGS. 2A and 2B, the size of the acceptance zone increases. Splaying the optical fibers in a hemispherical or other shape provides an omnidirectional acceptance zone that can accept optical energy from all directions.

Although each subset of optical fibers illustrated above has like numerical apertures, optical fibers of varying numerical apertures can be used; however, the separation distance of the splayed ends of optical fibers of varying numerical apertures will need to be adjusted to accommodate the different sized acceptance cones.

Figure 3:
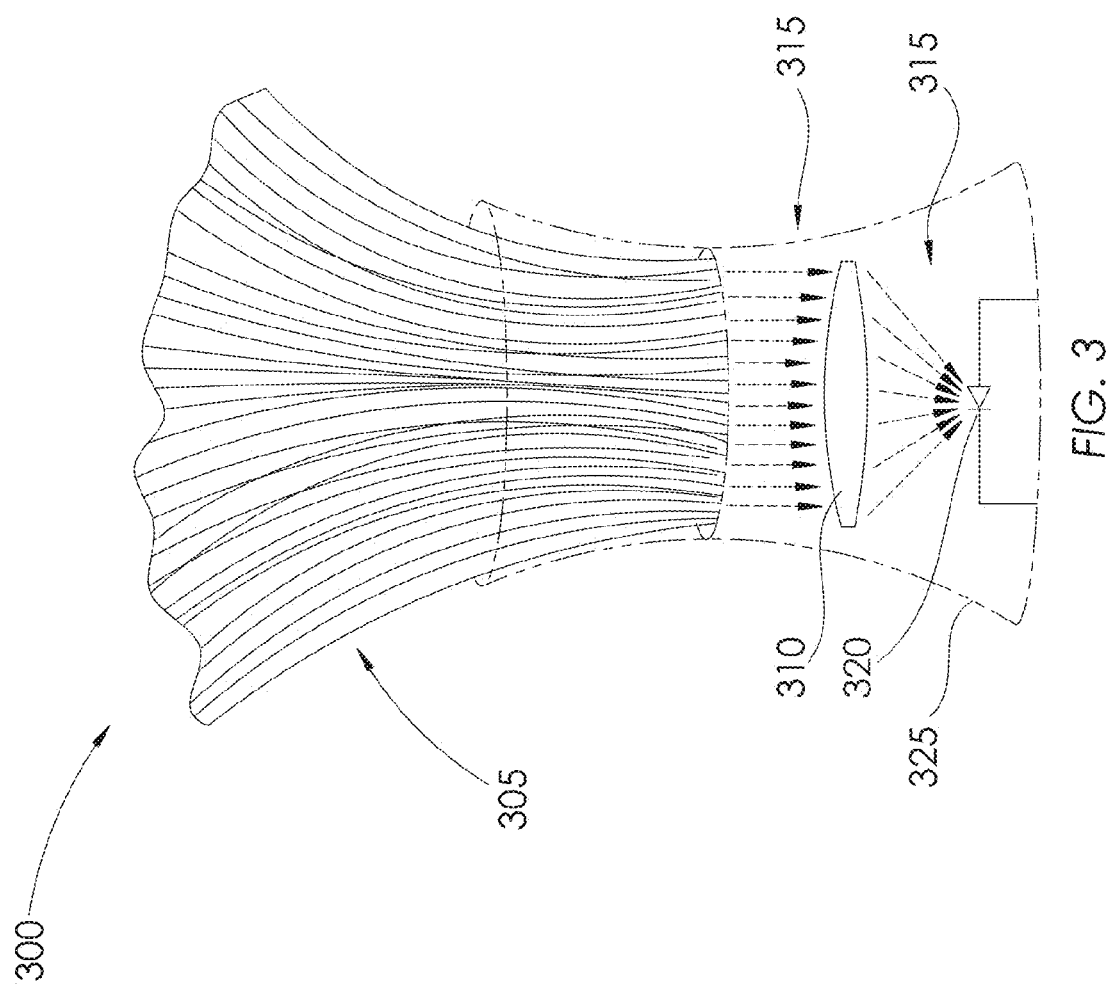
FIG. 3 is a diagram of a portion of a FSO receiver showing the transmission of FSO energy from a plurality of optical fibers to a photodetector according to an embodiment of the present invention.

Once light is coupled into the splayed ends of the optical fibers of a fiber bundle, it travels through the optical fibers to the non-splayed ends. A portion of receiver 300, showing the non-splayed ends of fiber bundle 305 is shown in FIG. 3. A focusing device, lens 310, receives optical energy 315 exiting the non-splayed ends and focuses it on photodetector 320. Although only one lens is shown, one or a plurality of lenses may be used to focus optical energy 315 on photodetector 320. In this embodiment, container 325 contains photodetector 325 and lens 310. It also may assist in providing structure to the non-splayed ends and keep non-splayed ends close together.

As used herein, a focusing device is any device that focuses the optical energy to a narrower area. The lens shown in FIG. 3 is an exemplary focusing device. In addition to a lens or lens assembly, other focusing devices can be readily incorporated into embodiments of the present invention. For example, a mechanical assembly such as a collimator can be used to focus optical energy 315 onto photodetector 320. In alternative embodiment, indexed matched epoxy or fusion splicing can be used to bring the fiber ends together into a fiber bundle from which optical energy exiting the bundle are concentrated on photodetector 320.

Photodetector 320 may be a single photodetector such as a PIN photodiode, field effect phototransistor, Schottky photodiode, M-S-M photodiode, M-I-S photodiode, bipolar phototransistor or any other semiconductor device, or may comprise a plurality of such devices. In an embodiment of the invention comprising fusion splicing, the non-splayed ends of the optical fibers are fused together providing a narrower output of optical energy than the original non-splayed ends of the optical fibers. Multiple devices/methods can be used to focus optical energy on the photodetector in a single embodiment of the invention.

Figure 4:
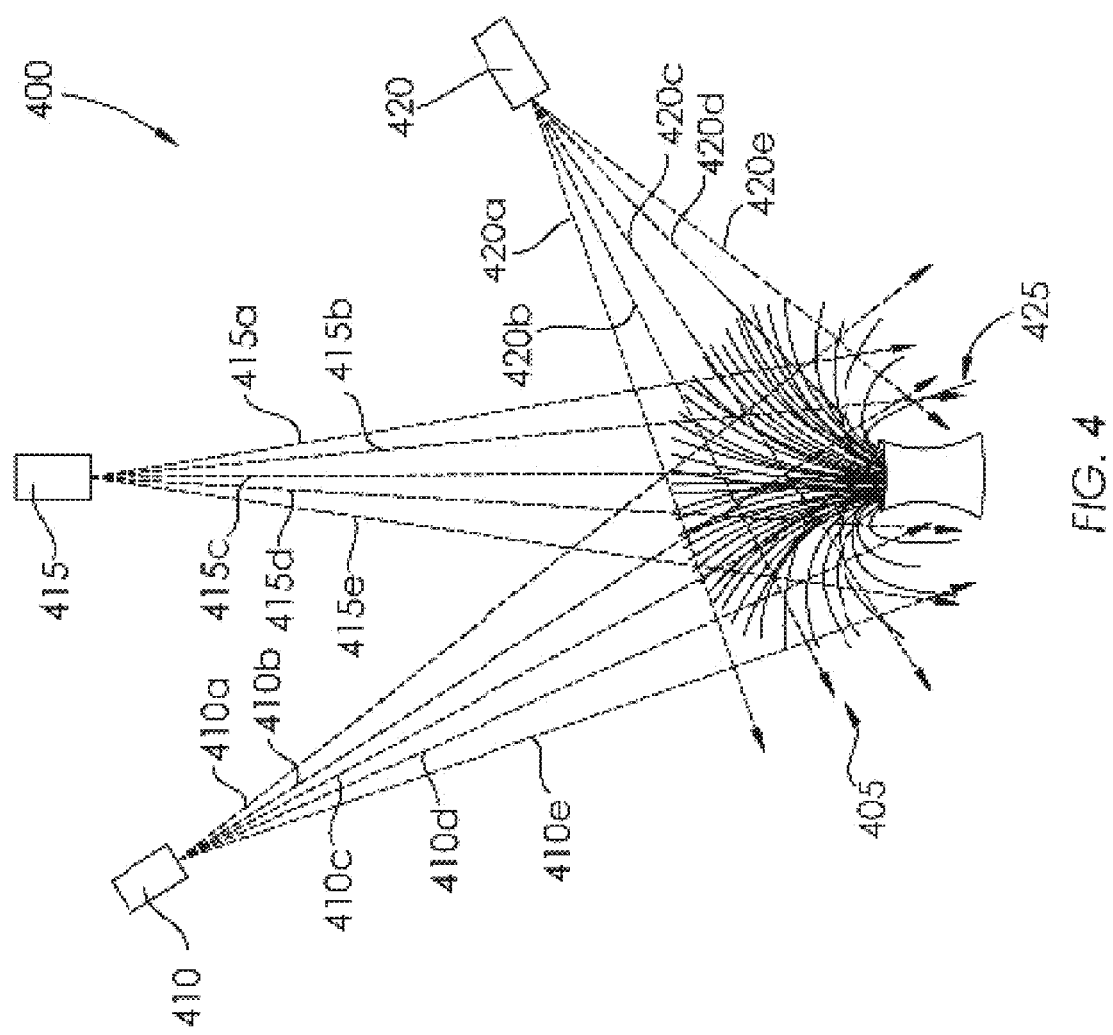
FIG. 4 is a diagram of a FSO communication system comprising a FSO receiver and three sources (or transmitters) according to an embodiment of the present invention.

Embodiments of the present invention may receive optical energy from multiple sources. An embodiment of FSO communication system 400 is shown in FIG. 4. Source 410, which emits a first FSO energy beam (comprising optical energy 410a-410e) that is received by receiver 425, is located at a first position. Source 415, which emits a second FSO energy beam (comprising optical energy 415a-e), is located at a second position, which is at a different angle from FSO receiver 425 than source 410. Source 420, which emits a third FSO energy beam (comprising optical energy 420a-420e), is located at a third position, which is at a different angle and distance than source 410 and source 415. Even though sources 410, 415 and 420 are at various distances and angles from receiver 425, the hemispherical shape of fiber bundle 405 provides for coupling of the photons from their respective FSO energy beams. Sources 410, 415 and 420 can be any FSO communication source including any source that emits visible and/or infrared beams, including, for example, light emitting diodes (LEDs) and lasers. While a hemispherical shape of fiber bundle 405 is shown and described herein, all other shapes are within the scope of the invention. The receiving fiber end faces of fiber bundle 405 may thus comprise any shape such as hemispherical as shown, elliptical, flat or any other shape. It is not necessary that the receiving fiber end faces of fiber bundle 405 form a defined shape.

Embodiments of the present invention can be used for transmission ranges up to about 5 kilometers; however, embodiments can be adapted for use over longer ranges and with fading channels. Embodiments of the present invention can work with standard FSO transmitters that utilize a laser or LED source to act as an omnidirectional source. Transmission wavelength is only dependent on the material that is used to make the device and can be designed according to the requirements of the system. Therefore, embodiments of the present invention can be integrated into preexisting FSO systems. Embodiments may also be used in new optical sensors and in optical wireless internet/networks.

Exemplary Simulation

Figure 5:
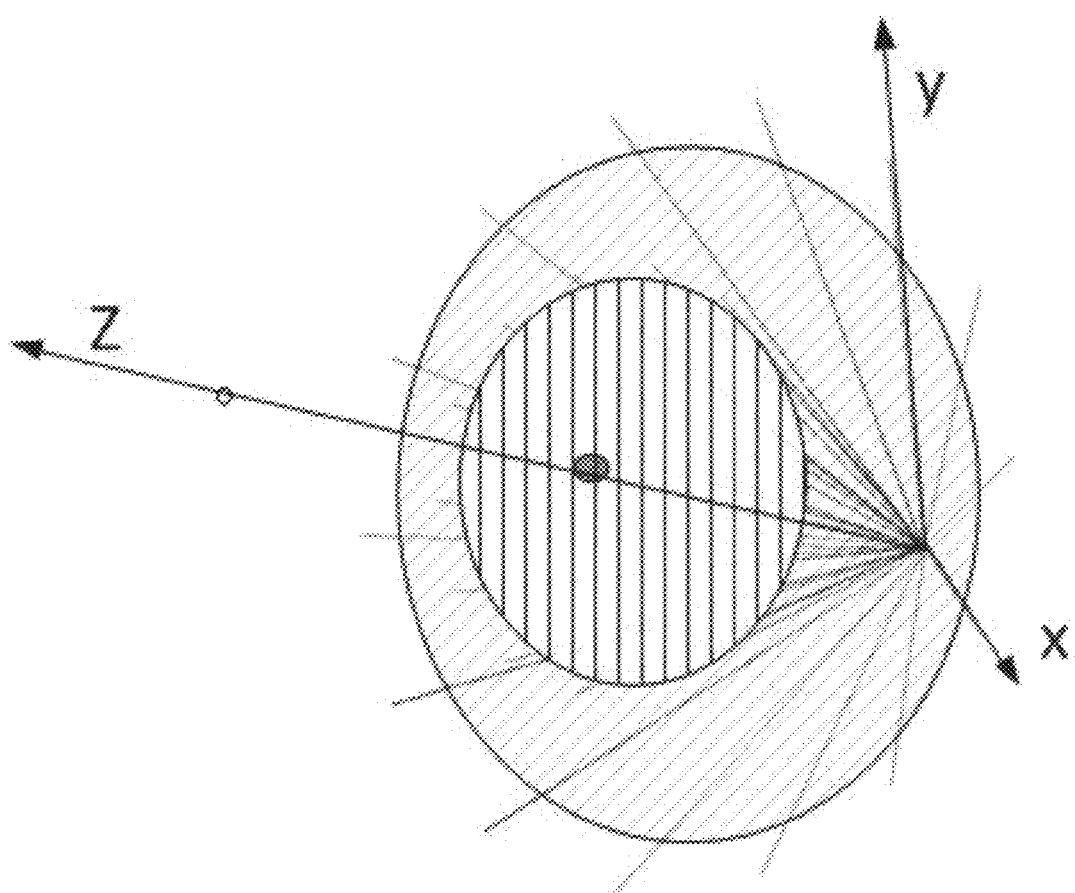
FIG. 5 is a diagram of an exemplary model of a fiber bundle of an O-FSO receiver modeled using Optical Software for Layout and Optimization (OSLO) according to an embodiment of the present invention.

An exemplary embodiment of a fiber bundle of an O-FSO receiver was modeled using an OSLO engine by Lambda Research Corporation. The exemplary OSLO model of the fiber bundle is shown in FIG. 5. In the exemplary model, standard 62.5/125 micron step index multimode fibers with numerical aperture of 0.275 and core index of 1.491 were used. The OSLO engine has a limit of 150 surfaces, which allowed only 29 fibers to be simulated. As a result, the hemispherical shape of the fiber bundle was divided into identical sections and the results from the simulated section were applied to all of the sections. The 29 fibers were arranged into two concentric conical patterns of 14 fibers and the fiber in each set of 14 fibers was equally distributed in the cone pattern. The last fiber was placed in the center of the two cones. The two cones had angles of 45 degrees and 22.5 degrees, respectively. In practice, a fan beam or a divergent lens can be used to transmit optical energy towards the receiving ends of the fiber bundle. Therefore, the OSLO extended source LED with a Gaussian profile was used for the exemplary simulation. The OSLO extended source LED with a Gaussian profile is represented by:

$$I(\theta) = I_o e^{-2\left(\frac{\theta}{\theta_d}\right)^2},$$

where $I_o$ is scalar initial intensity, and $\theta_d$ is the divergence angle of the source. The divergence angle can be used to calculate the solid angle, $\Omega$, of the transmitting source.

$$\Omega = \int_0^{2\pi} \int_0^{\theta_d} \sin(\theta) d\theta d\phi = 2\pi(1 - \cos(\theta_d))$$

Figure 6:
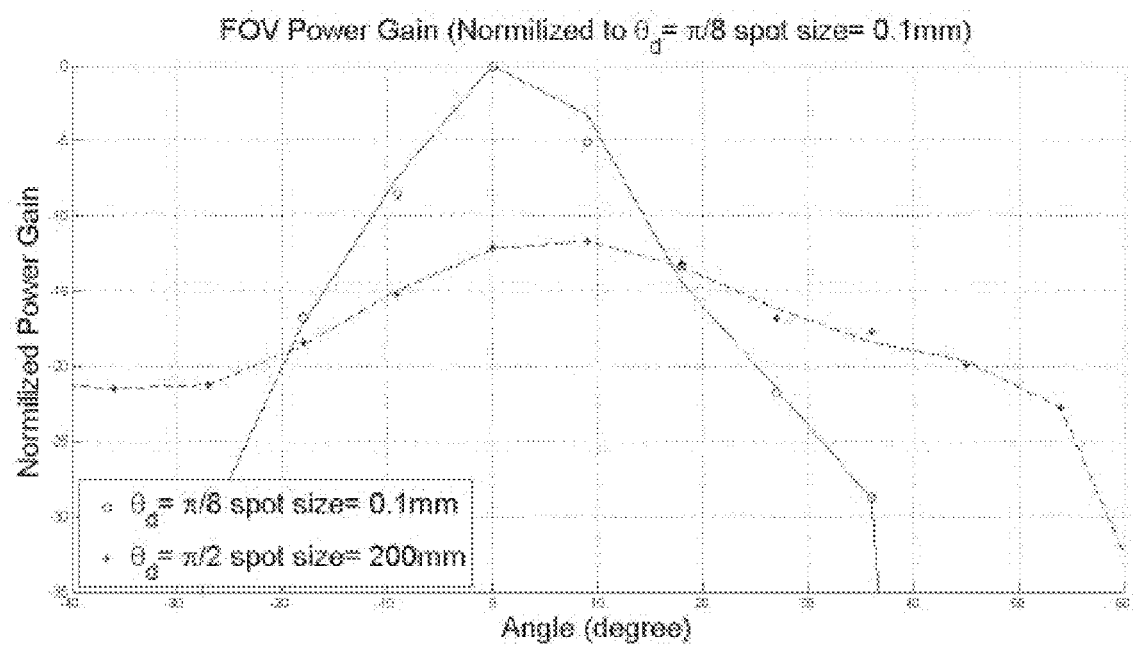
FIG. 6 is a field of view (FOV) plot for poignant and omni-directional sources normalized to the poignant source of an exemplary simulation performed using the exemplary model shown in FIG. 5.
Figure 7A:
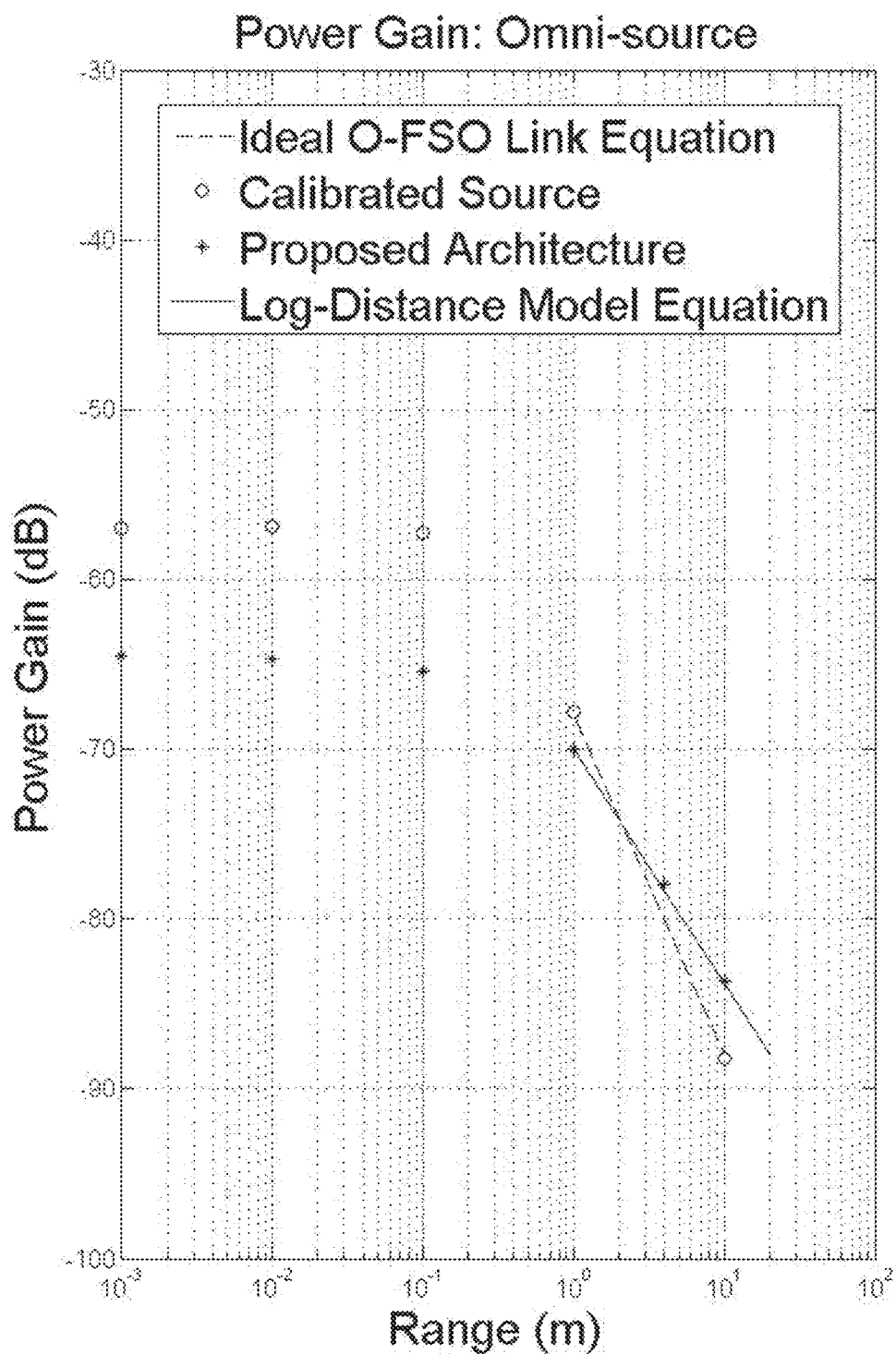
FIG. 7A is a graph showing range results of an omnidirectional source calibrated to the ideal O-FSO equation for an exemplary simulation performed using the exemplary model shown in FIG. 5.
Figure 7B:
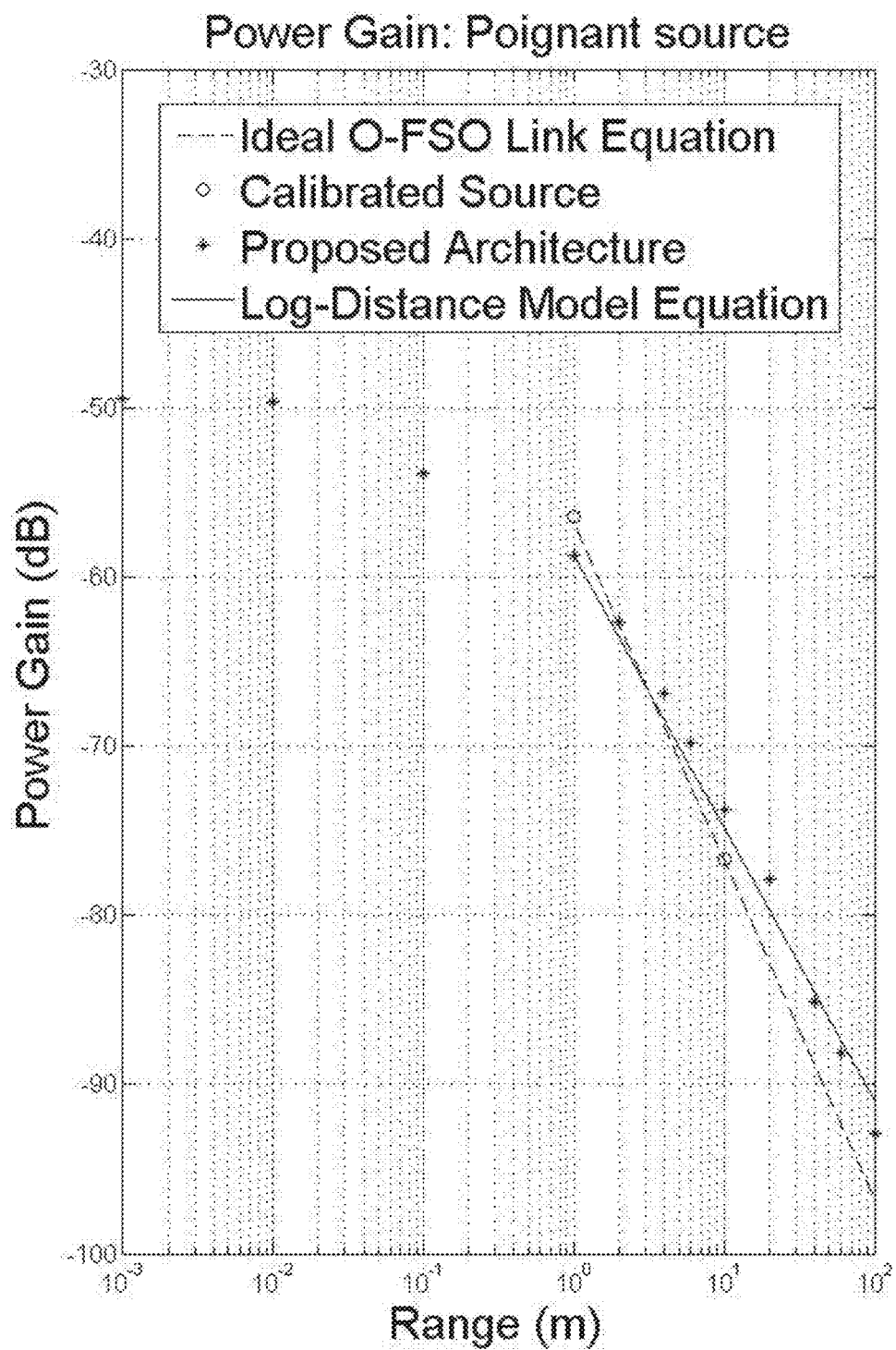
FIG. 7B is a graph showing range results of a poignant source calibrated to the ideal O-FSO equation for an exemplary simulation performed using the exemplary model shown in FIG. 5.

Solid angle can also be related to the beam width of the source. The solid angle of the transmitters in O-FSO equations are generally modeled as:

$$P_G = \frac{P_r}{P_t} = \frac{A}{\Omega R^2},$$

where A is the active area of the photodetector, D. is the solid angle of the transmitter source, R is the transceiver range, $P_r$ is the received power at the detector, and $P_t$ is the transmitted power. The power gain of the link, $P_G$, can be calculated as the ratio of power received divided by power transmitted. Also, path loss, $P_L$, is the negative of power gain ($P_L = -P_G$,) in decibel scale. The OSLO extended source LED transmits a circular distribution where the semi-height and semi-width (spot size) are defined at the $$\frac{1}{e^2}$$

point of the Gaussian distribution. Rays traced through the exemplary receiver model were organized probabilistically within the intensity profile of the source. The result of the simulation was the fraction of received power, or the ratio of the number of rays that successfully propagated through the exemplary receiver model divided by the total number of rays transmitted. The results for the FOV of the system are provided in FIG. 6. The improved range of the exemplary receiver model as compared to the predictions from the power gain, $P_G$, equation above are shown in FIGS. 7A and 7B.

The analysis of the exemplary O-FSO receive model involves two key parameters—omni-directionality and the received power as a function of range. Two sources, referred to herein as the omni-directional source and the poignant source, were utilized to test the omni-directionality of the exemplary receiver model. The omni-directional source has a divergence angle $\theta_d = 90°$ with a semi-height and semi-width of 200 mm, whereas the poignant source has $\theta_d = 22.5°$ with a semi-height and semi-width of 0.1 mm. The sources were swept relative to the contour of the exemplary receiver model. The results are shown in FIG. 6.

Figure 8:
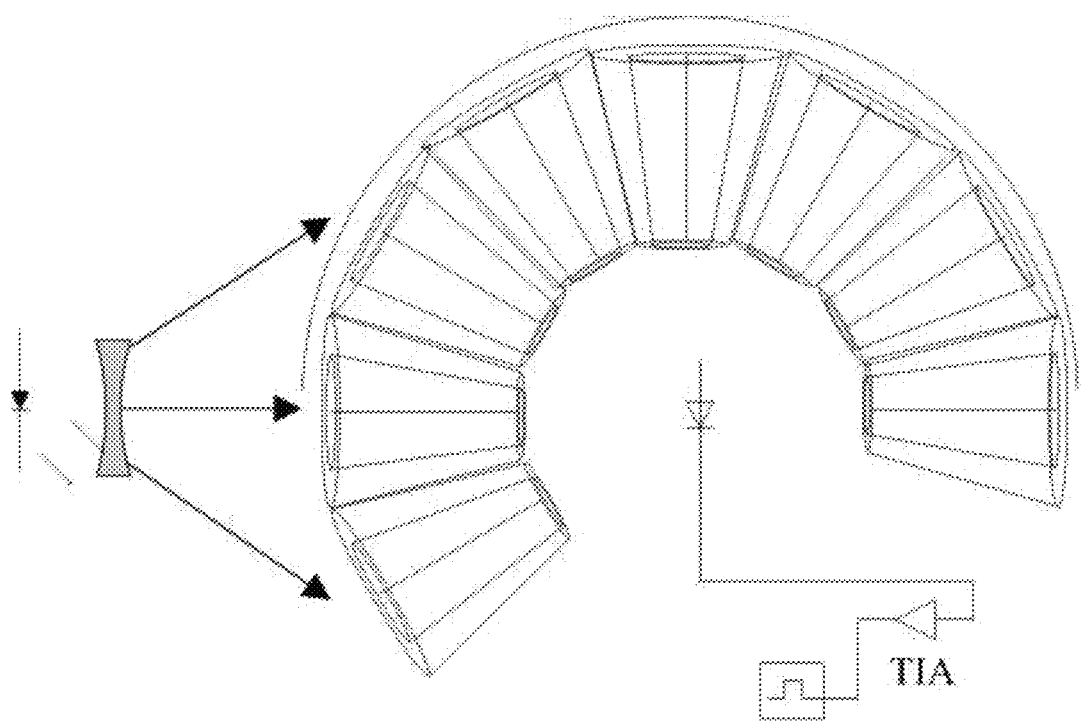
FIG. 8 is a diagram of an exemplary partial hemisphere arrangement of a receiver according to an embodiment of the present invention.

Multiple fiber structures side-by-side would qualitatively collect spill-over from their adjacent fiber structures, as illustrated in FIG. 8, which is a diagram of a subset of fiber structures of the exemplary receiver model. The results were a flattening of the response and an increase in the collected power.

The source was compared to the mathematical model represented by power gain, $P_G$, equation above to develop a baseline for the subsequent sections. This was accomplished by utilizing an independent OSLO model, different from that presented in herein. The results from the simulation are shown in FIGS. 9A and 9B.

Figure 9A:
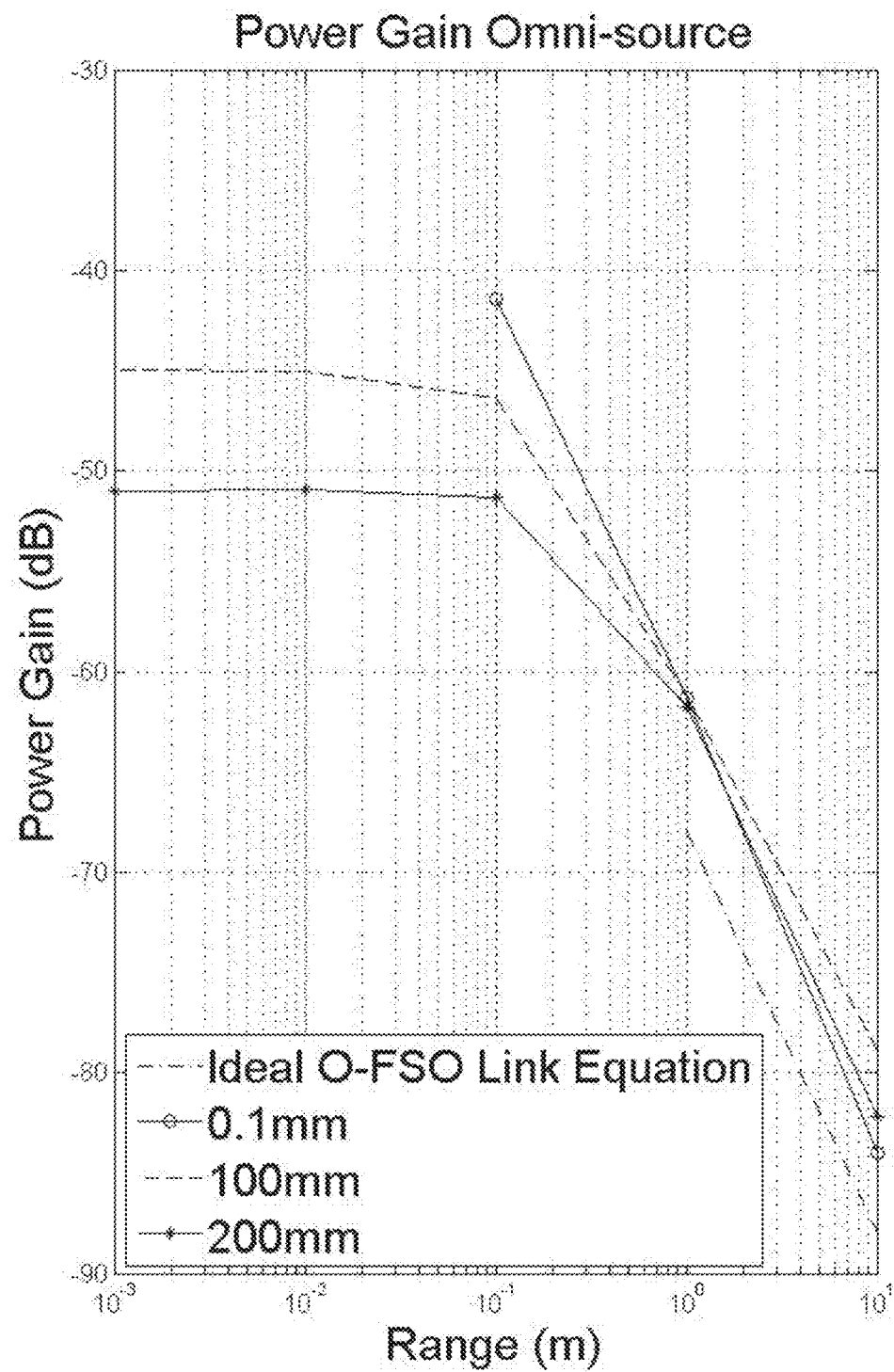
FIG. 9A is a graph showing OSLO results using an omni-directional source for three different spot sizes for an exemplary simulation performed using the exemplary model shown in FIG. 5.
Figure 9B:
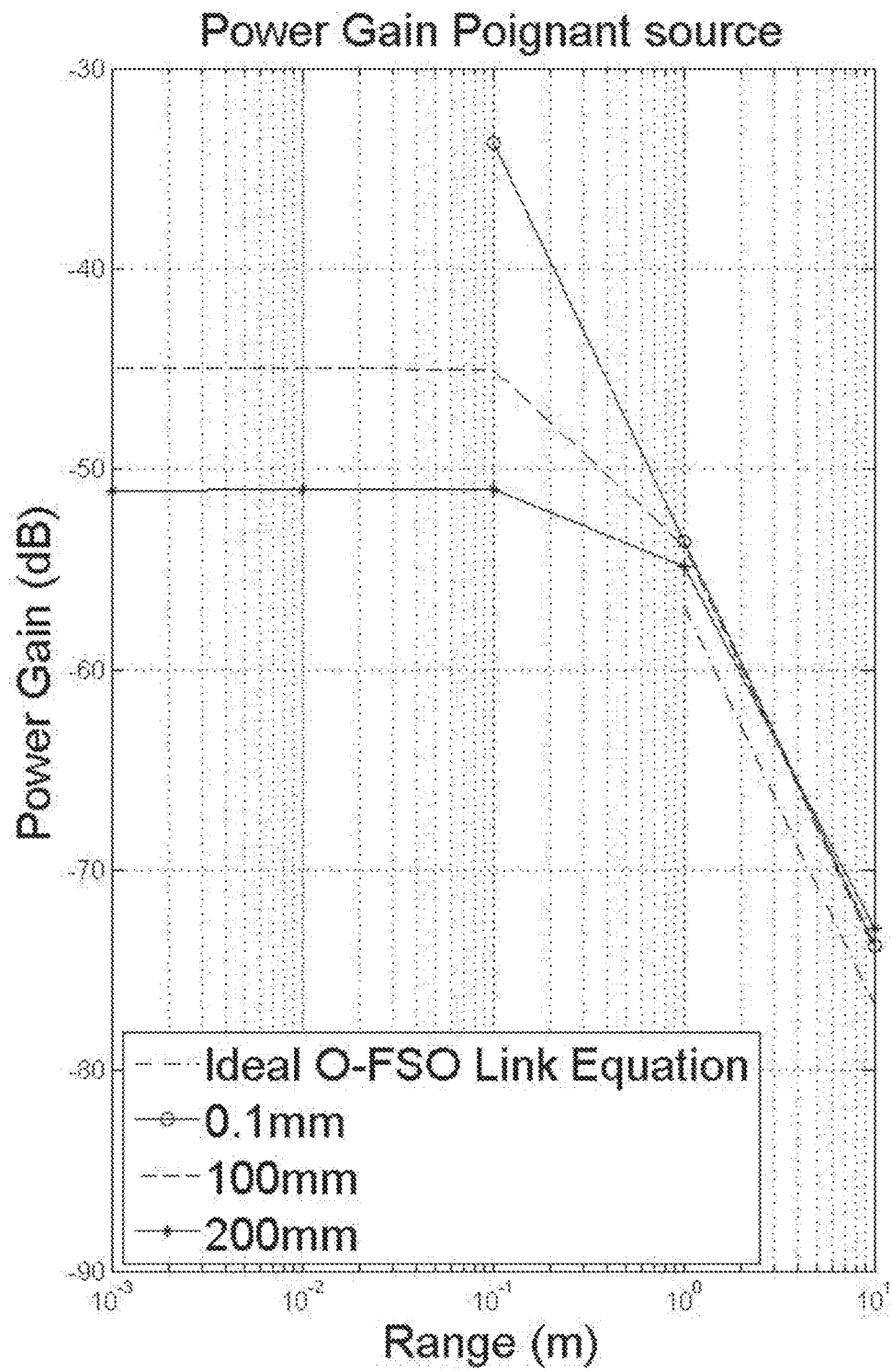
FIG. 9B is a graph showing OSLO results using a poignant source for three different spot sizes for an exemplary simulation performed using the exemplary model shown in FIG. 5.

It can be noted from FIGS. 9A and 9B that there is a maximum difference of 6 dB between the results obtained from OSLO and those predicted by the mathematical model represented by the power gain, $P_G$, equation above. Therefore, this difference must be accounted for while calibrating the sources. Spot size has little bearing on the system performance, so it can be ignored for systems exceeding one meter.

As mentioned, the exemplary O-FSO receiver is simulated with the two different sources then calibrated to predict a realistic power gain for the receiver for ranges shown in FIGS. 7A and 7B. The distance dependent power gain can be projected by incorporating data from FIGS. 9A and 9B into the following model:

$$P_G[\text{dB}] = y[\text{dB}] + m\log_{10}\left(\frac{d}{d_0}\right)[\text{dB}],$$

where y is the power gain of the system at one meter, m is the slope in dB/dec, d is the distance, and $d_0$ is the reference distance (one meter). For the omni-directional source: y=−70.0 dB and m=−13.8 db/dec and for the poignant source: y=−58.7 dB and m=−16.1 db/dec. The equation is valid for the linear region where d is greater than one meter. The data from the simulations as well as the equation for both sources are plotted in FIGS. 7A (omni-directional source) and 6B (poignant source).

Figure 10A:
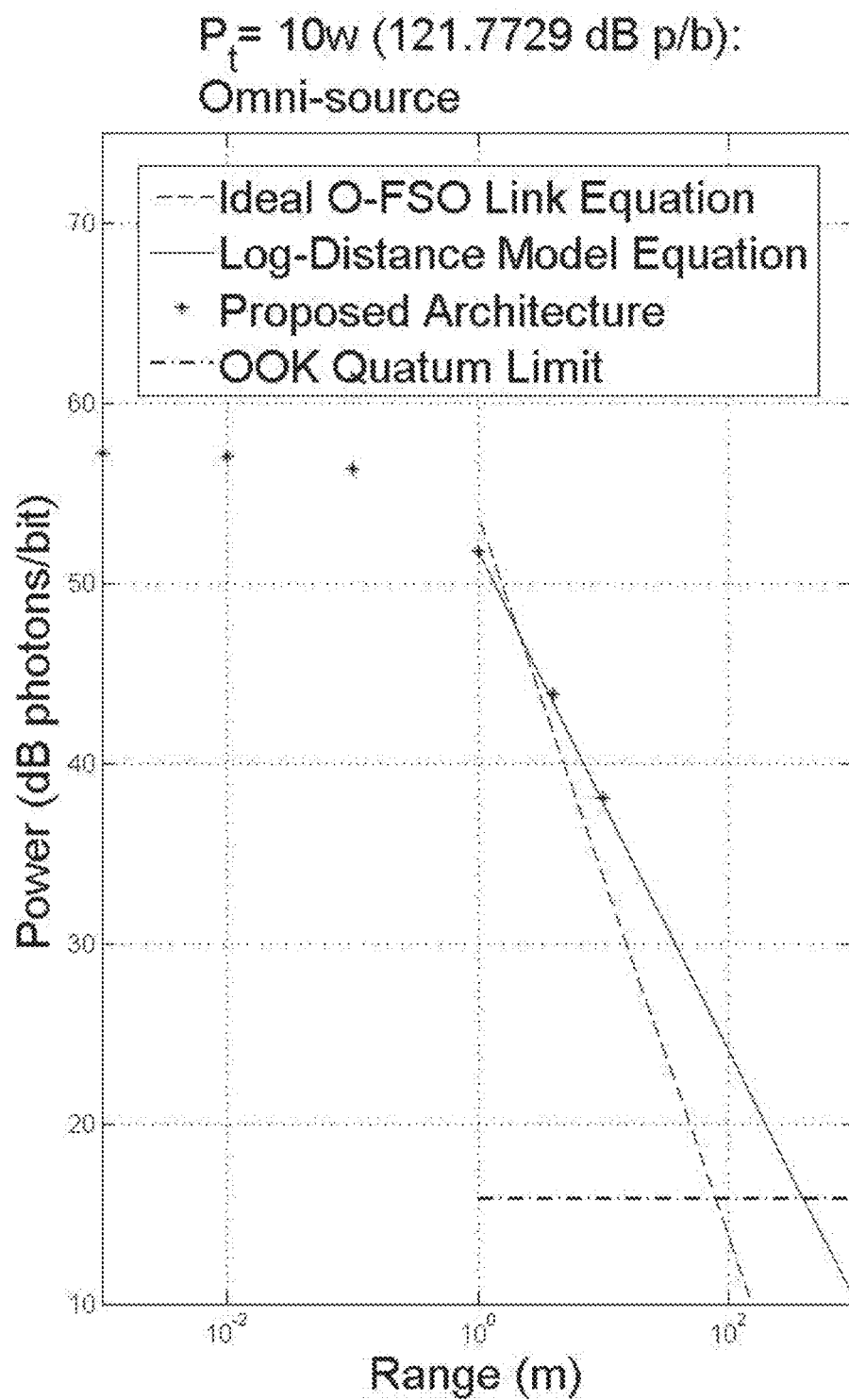
FIG. 10A is a graph comparing a calibrated omnidirectional source to an ideal O-FSO equation when a power (in dB photons/bit) is added to the power gain to result in power received for an exemplary simulation performed using the exemplary model shown in FIG. 5.
Figure 10B:
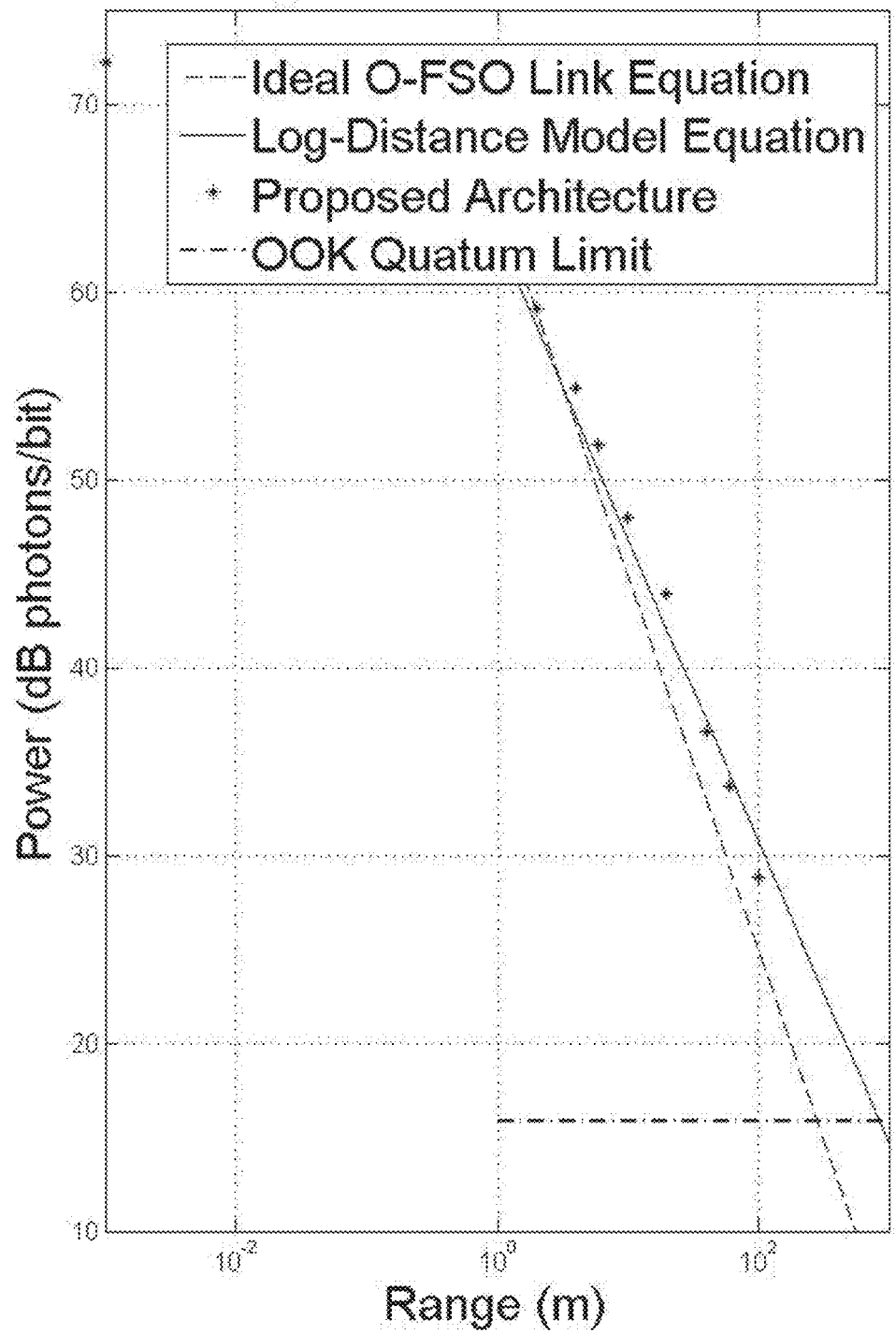
FIG. 10B is a graph comparing a calibrated poignant source to an ideal O-FSO equation when a power (in dB photons/bit) is added to the power gain to result in power received for an exemplary simulation performed using the exemplary model shown in FIG. 5.

A quantum limited or amplified spontaneous emission limited receiver with on/off key modulation was used to develop a benchmark capable of predicting the feasibility of the exemplary receiver model for ranges between 100 m and one kilometer. This leads to a received power of 15.8 dB photons/bit and system performance with Bit Error Rate (BER) of $10^{-9}$. The conversion from watt to photons per bit, $$\frac{p}{b},$$

is given by:

$$P_{p/b} = \frac{P_{watt}\lambda}{h*c*DR'}$$

where DR is the data rate of the signal that is being sent. FIGS. 10A and 10B assume that the data type is non-return-to-zero, operating at 1550 nm with a OC-1 bandwidth of 51.84 Mb/sec and the transmitted power is 10 watts, which corresponds to a transmitted power of 127.77 dB p/b.

FIGS. 10A and 10B highlights improvement in post calibration range compared to the ideal O-FSO equation in both omni-directional source and poignant source cases. The range is greater than 400 m with 10 watts power applied and assumes quantum limited receiver conditions and BER is $10^{-9}$ or better for ranges of 400 m or higher.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

What is claimed is:

1. A free space optical receiver comprising:
a plurality of optical fibers each having a first and a second end, wherein the first ends of the plurality of optical fibers are splayed apart for receiving free space optical energy; and
a photodetector communicatively coupled to the second ends of the plurality of optical fibers and positioned to receive the free space optical energy from the second ends of the plurality of optical fibers.

2. The free space optical receiver of claim 1, wherein each of the first ends of each of the plurality of optical fibers have an acceptance cone and wherein the first ends of the plurality of optical fibers are splayed apart such that the acceptance cones of the first ends of the plurality of optical fibers overlap to form an omnidirectional acceptance zone.

3. The free space optical receiver of claim 1, further comprising:
a focusing device communicatively coupled to the second ends of the plurality of optical fibers and to the photodetector and positioned to receive the free space optical energy from the second ends of the plurality of optical fibers and to transmit the free space optical energy to the photodetector.

4. The free space optical receiver of claim 1, further comprising an indexed-matched epoxy in communication with the second ends of the plurality of optical fibers and communicatively coupled to the photodetector.

5. The free space optical receiver of claim 1, wherein two or more of the second ends of the plurality of optical fibers are fused together and the fused second ends are communicatively coupled to the photodetector.

6. The free space optical receiver of claim 1, wherein the second ends of the plurality of optical fibers are fused together and the fused second ends are communicatively coupled to the photodetector.

7. The free space optical receiver of claim 1, wherein the splayed apart plurality of optical fibers form a hemispherical shape.

8. The free space optical receiver of claim 1, wherein the plurality of optical fibers are multimode optical fibers.

9. The free space optical receiver of claim 1, wherein the plurality of optical fibers are step index multimode optical fibers.

10. The free space optical receiver of claim 1, wherein the plurality of optical fibers are step index multimode optical fibers having a 62.5 μm core diameter, a 125 μm cladding diameter, a numerical aperture of 0.275 and a core index of 1.491.

11. The free space optical receiver of claim 1, wherein the plurality of optical fibers are plastic optical fibers.

12. The free space optical receiver of claim 1, wherein the plurality of optical fibers are glass optical fibers.

13. The free space optical receiver of claim 1, wherein the length of each the plurality of optical fibers is between eight and ten inches.

14. The free space optical receiver of claim 3, wherein the focusing device comprises at least one lens.

15. The free space optical receiver of claim 3, wherein the focusing device is a collimator assembly.

16. An optical communication system comprising:
a transmitter configured to transmit free space optical energy; and a receiver configured to receive free space optical energy, wherein the receiver comprises
    a plurality of optical fibers each having a first and a second end, wherein the first ends of the plurality of optical fibers are splayed apart for receiving the free space optical energy, and
    a photodetector communicatively coupled to the second ends of the plurality of optical fibers and positioned to receive free space optical energy from the second ends of the plurality of optical fibers.

17. The optical communication system of claim 16, wherein each of the first ends of each of the plurality of optical fibers have an acceptance cone and wherein the first ends of the plurality of optical fibers are splayed apart such that the acceptance cones of the first ends of the plurality of optical fibers overlap to form an omnidirectional acceptance zone.

18. The optical communication system of claim 16, wherein the receiver further comprises a focusing device communicatively coupled to the second ends of the plurality of optical fibers and to the photodetector and positioned to receive the free space optical energy from the second ends of the plurality of optical fibers and to transmit the free space optical energy to the photodetector.

19. The optical communication system of claim 16, further comprising an indexed-matched epoxy in communication with the second ends of the plurality of optical fibers and communicatively coupled to the photodetector.

20. The optical communication system of claim 16, wherein two or more of the second ends of the plurality of optical fibers are fused together and the fused second ends are communicatively coupled to the photodetector.

21. The optical communication system of claim 16, wherein the second ends of the plurality of optical are fused together and the fused second ends are communicatively coupled to the photodetector.

22. The optical communication system of claim 16, wherein the splayed apart plurality of optical fibers form a hemispherical shape.

23. The optical communication system of claim 18, wherein the focusing device comprises at least one lens.

24. The optical communication system of claim 18, wherein the focusing device is a collimator assembly.

25. An optical communication system comprising:
    a first transmitter at a first position configured to transmit a first free space optical energy beam;
    a second transmitter at a second position configured to transmit a second free space energy beam;
    a receiver configured to receive the first free space optical energy beam and the second free space energy beam, wherein the receiver comprises
        a first and second optical fibers each having a first and a second end, wherein the first ends of the first and second optical fibers are splayed apart and wherein the first end of the first optical fiber is positioned to receive the first free space optical energy beam and the first end of the second optical fiber is positioned to receive the second free space optical energy beam, and
        a photodetector communicatively coupled to the second ends of the first and second optical fibers and positioned to receive the first and second free space optical energy beams from the second ends of the first and second optical fibers.

26. The optical communication system of claim 25, wherein the receiver further comprises a focusing device communicatively coupled to the second ends of the first and second optical fibers and to the photodetector and positioned to receive the first and second free space optical energy beams from the second ends of the first and second optical fibers and to transmit the first and second free space optical energy beams to the photodetector.

27. The optical communication system of claim 25, further comprising an indexed-matched epoxy in communication with the second ends of the first and second optical fibers and communicatively coupled to the photodetector.

28. The optical communication system of claim 25, wherein the second ends of the first and second optical fibers are fused together and the fused second ends are communicatively coupled to the photodetector.

29. The optical communication system of claim 26, wherein the focusing device comprises at least one lens.

30. The optical communication system of claim 26, wherein the focusing device is a collimator assembly.

* * * * *